(12) United States Patent
Sternberg et al.

(10) Patent No.: US 9,365,808 B2
(45) Date of Patent: Jun. 14, 2016

(54) COMPOSITION AND SYSTEM FOR TREATING A DRAIN AND METHODS THEREOF

(71) Applicants: Eric Sternberg, Wantagh, NY (US); Randy Kaplan, Huntington, NY (US); Mathew Sternberg, Seaford, NY (US)

(72) Inventors: Eric Sternberg, Wantagh, NY (US); Randy Kaplan, Huntington, NY (US); Mathew Sternberg, Seaford, NY (US)

( * ) Notice: Subject to any disclaimer, the term of this patent is extended or adjusted under 35 U.S.C. 154(b) by 0 days.

(21) Appl. No.: 14/465,829

(22) Filed: Aug. 21, 2014

(65) Prior Publication Data

US 2014/0360532 A1 Dec. 11, 2014

Related U.S. Application Data

(63) Continuation-in-part of application No. 13/631,016, filed on Sep. 28, 2012, now abandoned.

(51) Int. Cl.
| | |
|---|---|
| *C11D 7/02* | (2006.01) |
| *C11D 7/10* | (2006.01) |
| *B08B 9/027* | (2006.01) |
| *C11D 11/00* | (2006.01) |
| *C11D 17/04* | (2006.01) |
| *E03C 1/30* | (2006.01) |
| *G01F 11/28* | (2006.01) |
| *B65D 75/52* | (2006.01) |
| *B65D 75/58* | (2006.01) |

(52) U.S. Cl.
CPC .. *C11D 7/10* (2013.01); *C11D 7/02* (2013.01); *C11D 11/0023* (2013.01); *C11D 17/042* (2013.01); *C11D 17/046* (2013.01); *E03C 1/30* (2013.01); *G01F 11/286* (2013.01); *B65D 75/522* (2013.01); *B65D 75/5805* (2013.01); *B65D 75/5883* (2013.01); *B65D 2575/583* (2013.01); *B65D 2577/042* (2013.01)

(58) Field of Classification Search
CPC ............ C11D 3/122; C11D 7/02; C11D 7/10; B08B 9/027
See application file for complete search history.

(56) References Cited

U.S. PATENT DOCUMENTS

| | | | |
|---|---|---|---|
| 3,091,374 A | 5/1963 | Schwartzman | |
| 3,198,740 A | 8/1965 | Dunlop et al. | |
| 3,471,407 A | 10/1969 | Spring | |
| 3,525,426 A | 8/1970 | Miller | |
| 3,968,048 A * | 7/1976 | Bolan | C09G 1/14 134/29 |
| 4,159,068 A | 6/1979 | Lowe | |
| 4,522,738 A | 6/1985 | Magid et al. | |
| 4,587,032 A | 5/1986 | Rogers | |
| 4,610,800 A | 9/1986 | Durham et al. | |
| 4,778,617 A * | 10/1988 | Shaer | C11D 7/10 510/108 |
| 4,917,268 A | 4/1990 | Campbell et al. | |
| 5,078,301 A | 1/1992 | Gladfelter et al. | |
| 5,253,759 A | 10/1993 | Gouge et al. | |
| 6,484,879 B2 | 11/2002 | Desmarais et al. | |
| 6,624,130 B2 | 9/2003 | Giblin et al. | |
| 7,712,633 B2 | 5/2010 | Kennedy et al. | |
| 2005/0061704 A1 | 3/2005 | Cole et al. | |
| 2011/0017772 A1 | 1/2011 | Jacoulet et al. | |
| 2011/0215020 A1 | 9/2011 | Rapp | |

* cited by examiner

*Primary Examiner* — Brian P Mruk
(74) *Attorney, Agent, or Firm* — Michael P. Kochka, Esq.

(57) ABSTRACT

Embodiments of the present disclosure generally relate to a composition, system, and method of unclogging and maintaining a drain or conduits that deliver fluids such as water. The system includes delivering a predetermined amount of drain cleaning composition to an obstruction wherein the predetermined amount may be delivered by a single-use packet. The composition for clearing a clogged drain may include sodium bisulfate, moisture, sodium sulfate, potassium, calcium, or iron.

8 Claims, 5 Drawing Sheets

COMPOSITION AND SYSTEM FOR TREATING A DRAIN AND METHODS THEREOF

CROSS-REFERENCE TO RELATED APPLICATIONS

This application is a continuation-in-part of U.S. patent application Ser. No. 13/631,016, filed Sep. 28, 2012, entitled "System and Method of Treating a Drain," which claims priority to U.S. provisional patent application Ser. No. 61/540,506, filed Sep. 28, 2011, the disclosures of which are incorporated by reference herein in their entireties.

BACKGROUND

1. Field of the Invention

Embodiments of the present invention relate to treating drains and fluid-pipe delivery and plumbing systems. More specifically, embodiments of the present invention relate to a composition, system, and method of treating conduits including unclogging of drains.

2. Description of the Related Art

Passageways, including drains and conduits typically become clogged or non-functional as a result of the accumulation of objects over time or in an instance where too many objects are forced through a path and lodge. Sometimes a clog may be formed by a single object. Sometimes an obstruction may be cause by mold, mildew, or water minerals, grease, or the like that forms a barrier in an underused or overused passageway. In other instances, an infestation of pests may further lead to obstruction.

Whatever circumstances surround an obstruction, it is necessary for the passage(s) to be cleared so operation of a machine or other function dependent on the conduit may perform properly and efficiently. Some machines or other functions that rely upon and or relate to conduits are for example, toilets, sinks, reservoirs, washing machines, and corresponding drains therein, and other appliances, not limited to commercial, industrial and residential environments.

Generally an obstruction is relieved by use of a plunger-type mechanism, a plumbing snake or chemicals. A plunger-type mechanism is generally used by a broad range of users that include individual's first effort based on the convenience, supply, and simplicity of the plunger. The plumbing snake is typically an instrument use by professionals whereby a line is introduced into a conduit and the operator forces the line to break and or pass through an obstruction. Chemicals have both commercial and domestic applications. Typically a user dispenses an amount of a chemical into a drain and the chemical reacts and dissolves the material.

The plunger is not always effective and may be laborious. Furthermore, a plunger can produce an unsanitary atmosphere. Special care needs to be taken to make sure waste does not escape a toilet, for example. And, it is important to make sure that a plunger is always clean and sanitized, especially when transitioning from a toilet for example to a kitchen sink.

A plumbing snake is a comparably large and bulky machine that may be labor intensive and require training as well as sufficient storage space. While the plumbing snake may be more effective than a plunger in certain instances, it too must always be clean and sanitized. Also, different size snakes may be required for different circumstances as all lines cannot penetrate all conduits, for example, a line that would penetrate a toilet may not necessarily fit a kitchen drain.

Chemicals provide the benefit of avoiding the need to maintain and sanitize a tool and do not necessarily require much labor. Unfortunately drawbacks associated with chemicals are that a general user and or consumer may not know an appreciable range of chemical necessary to cure an obstruction in a sink or toilet for example, leading to excessive overuse. Over time, overuse may lead to premature corrosion of pipes and require costly replacements.

In addition, typical drain clearing chemicals produce heat to clear clogs, which may lead to further corrosion or damage to pipes. In the case of cleaning a toilet clog, the only products that may be used are enzymes and sulfuric acid in liquid form. Enzymes will not clear a clog, however, and sulfuric acid in liquid form is extremely hazardous to individuals deploying the chemical. Further, drain clearing chemicals are usually offered in liquid form, which creates the potential for splashing and contacting the user's eyes or skin and causing injury. The few granular products that are available will heat up upon contact with moist skin, creating the potential to burn the user. Lastly, because drain opening chemicals use heat to clear a clog, the material causing the clog may re-solidify further down in the system when it has cooled, thus creating a clog at a second site.

Therefore, there is a need to have an effective option to clean conduits that is not labor intensive, does not require cleaning and or maintenance, does not require a chemical that produces heat, is safer for use by consumers than existing liquid and caustic granular drain cleaners, and reduces suffering of pipes and costly repairs.

SUMMARY

Embodiments of the present disclosure generally relate to a composition, delivery system, and method for unclogging a conduit and/or passageways, and not limited to environments having a drain, that allows an operator to successfully clean a drain or conduit in a sanitary environment without labor or undue burden on pipe integrity. In exemplary embodiments, a composition for clearing a clogged drain may be provided. The composition may comprise sodium bisulfate and at least one of moisture, sodium sulfate, potassium, calcium, and iron.

In another embodiment of the present disclosure, method for clearing a clogged drain is provided. The method may comprise providing a single use packet, the packet comprising a wall forming a chamber and a granular drain-clearing composition disposed within the chamber; opening the single-use packet; and dispensing the composition into the clogged drain via the single-use packet and allowing the composition to clear the clogged drain.

In yet another embodiment of the present disclosure, a kit for use in clearing a clogged drain may be provided. The kit may comprise a plurality of single-use packets, each packet comprising a wall forming a chamber, a portion of the wall constructed to be torn open; a pre-measured amount of a drain-clearing composition disposed in the chamber of each packet, the composition comprising sodium bisulfate, the pre-measured amount comprising the minimal amount of drain-clearing composition necessary to clear the clogged drain.

BRIEF DESCRIPTION OF THE DRAWINGS

So the manner in which the above recited features of the present disclosure can be understood in detail, a more particular description of embodiments of the present disclosure, briefly summarized above, may be had by reference to embodiments, which are illustrated in the appended drawings. It is to be noted, however, the appended drawings illustrate only typical embodiments of embodiments encompassed within the scope of the present disclosure, and, therefore, are not to be considered limiting, for the present disclosure may admit to other equally effective embodiments, wherein.

Figure 1:
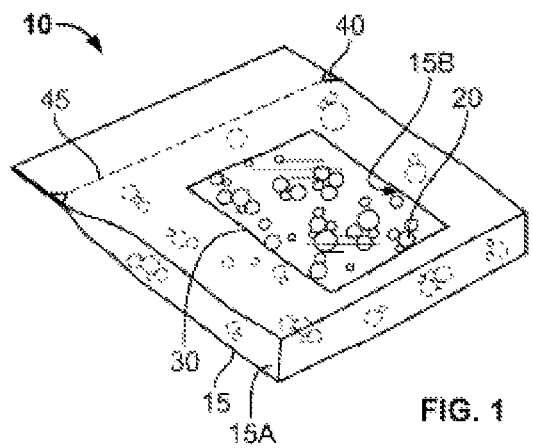
FIG. 1 is a perspective view of an embodiment of a container that shows for example how composition may be accessed.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention relate to treating drains and fluid-pipe delivery and plumbing systems. More specifically, embodiments of the present invention relate to a composition, system, and method of treating conduits including unclogging of drains. As used herein, the term "plurality" may refer to more than one.

The current invention is a delivery system and method for displacing an obstruction in a conduit such as a drain, pipe, or other passageway. An embodiment of the invention comprises a container 10 that has a chamber 15 surrounding a pre-measured or pre-determined amount of a composition 20 necessary to displace an obstruction in a conduit and or unclog a drain.

In exemplary embodiments, a composition 20 may be delivered to the site of a clogged drain to clear a clog. A composition 20 may comprise a material that does not produce heat yet still clears the clog. The composition 20 may be in granular form, and may be stored in, and/or delivered from, containers, packets, or the like in accordance with embodiments of the present disclosure. A composition 20 may also be comparatively safe when compared with liquid drain clearing chemicals, or the like, whereby when the composition 20 comes into contact with a user's skin, or the like, the composition 20 does not damage the user's skin to the extent liquid drain clearing chemicals do. The composition 20 may generally comprise sodium bisulfate. Sodium bisulfate is the sodium salt of the bisulfate anion, with the molecular formula NaHSO4. Sodium bisulfate is an acid salt formed by partial neutralization of sulfuric acid by an equivalent of sodium, typically either in the form of sodium hydroxide or sodium chloride. It is a dry granular product that can be safely shipped and stored.

In accordance with embodiments of the present invention, sodium bisulfate may be delivered to the site of a clog to clear the clog in a drain, or the like. When administered in accordance with embodiments of the present invention, sodium bisulfate breaks down organic matter and allows it to flow out of the clogged pipe into another area without re-solidifying. The use of sodium bisulfate as a drain cleaner in accordance with embodiments of the present invention provides numerous advantages. Sodium bisulfate produces no heat, so it is comparatively safer for pipes than drain clearing chemicals that produce heat to clear a clog. Chemicals that cause heat to clear a clog may cause damage to pipes, or the like, or the user when spilled. The use of sodium bisulfate as a drain cleaner solves this problem due to the lack of heat production. Unlike most drain clearing chemicals, sodium bisulfate can be used in toilets to clear a clog because it is in a granular form and breaks down organic matter to allow it to flow out of the pipes. The only other products that can be used in toilets are enzymes which will not clear a clog and sulfuric acid in liquid form which is extremely hazardous to potential consumers.

A composition 20 comprising sodium bisulfate is comparatively safer than conventional drain openers for several reasons. Sodium bisulfate can be delivered in granular form so that splashing is minimal when compared with liquid drain openers. Liquid drain openers may splash in a user's eyes or on their skin, causing injury. When compared to other drain openers, the use of sodium bisulfate produces no heat and will not burn if a user gets it on his or her skin, as it would with conventional drain opening chemicals, or the like.

Further, another disadvantage of conventional drain openers that use heat to clear a clog, is that the material causing the clog is released by the heat but may then re-solidify further down the system. A composition 20 in accordance with embodiments of the present invention may break down organic matter and let it flow out of the clogged area, pipes, or the like without re solidifying. In some embodiments, the composition 20 may comprise sodium bisulfate and other elements that may be included for producing the composition. For example, the composition 20 may comprise sodium bisulfate, moisture, sodium sulfate, potassium, calcium, iron, and/or the like. In some embodiments, the composition 20 may comprise sodium bisulfate in the amount of approximately 80%-100%, moisture in the amount of approximately less than 0.1%-0.3%, sodium sulfate in the amount of approximately 3%-9%, calcium in the amount of approximately less than 0.5%-1.5%, and iron in the amount of approximately less than 0.5%-1.5%, or the like. For example, the composition 20 may comprise sodium bisulfate in the amount of approximately 93%, moisture in the amount of approximately less than 0.2%, sodium sulfate in the amount of approximately 6%, calcium in the amount of approximately less than 1%, and iron in the amount of approximately less than 1%, or the like As shown in FIG. 1, an embodiment of a container 10 may include a single-use article such as a pack, packet or some other porting device that has an outer wall 15A and an inner wall 15B, the combination of which may form single wall of chamber 15 having two sides (aka an interior and an exterior) wherein it is considered that the single wall surrounds composition 20 located in the interior of chamber 15.

Packet 10, for example, may be formed of any material that will be inert and or unreactive to composition 20 contained therein as well as inert to ambient conditions as to not affect composition. As shown in FIG. 1, in an embodiment, a portion of packet 10 is clear so that contents 20 may be visible through window 30, so that the composition 20 may be determined without obstructing wall 15. It is understood however that the entire packet 10 and or wall 15 (i.e., 15A and 15B) may be clear so that contents 20 are visible at all views. A further embodiment includes instance whence wall 15 is used to identify contents such as composition 20 and strength for example which can be identified by coloring of wall or composition, labeling therein, or other-type insignia or identification known. A further embodiment includes such instance where wall is opaque.

Although FIG. 1 shows an embodiment of a packet 10 that is rectangular, container 10 may include other geometrical forms and structures known for containing, holding, transporting, and or delivering a product and not limited to structures including those associated with forms and objects not limited to a bag, a disk, a rectangle, a ball, and the like wherein the forms and objects may contain a single wall or single side, or even several sides or walls.

The composition 20 within container 10 may be any suitable material such as a chemical composition that is known to clear drains, treat sewage, treat pipes, or interact in any other manner known in the field that relates to a substance being transported through a conduit for treating, interacting, carrying or transporting therein.

The form of composition 20 may be liquid or solid, wherein when in the solid state, it may include form not limited to granules, pellets, or other known forms. Notwithstanding, it is necessary that the amount of composition 20 in chamber 15 or contained in packet 10 be an amount minimally sufficient to displace an obstruction, i.e., extricate a conduit so that unnecessary over use of a harmful chemical or other product is avoided. While a single-use application may be generally acceptable, some instances may require an additional container packet, in which case a second or third container, etc., may be used. Furthermore, it is an embodiment of the invention to have different volume container packets that may be required for applications which can be known to require more than one application.

Composition 20 may be released and or dispensed from container 10 though communicating displaced portions of chamber walls 15A and 15B. As mentioned this may also be referred to as displacing a single wall of chamber 15 having two sides. The displacement may be made through physical means not limited to a tab, a tear, perforation, a peel away portion, a puncture portion, or other similar like engagements. FIG. 1 shows the embodiment where tear 40 may be united with a perforation 45, for example.

Another embodiment of the invention includes dispensing predetermined amount of composition 20 by displacing chamber wall through chemical means that includes dissolving a portion of outer wall 15A and a communicating portion of inner wall 15B.

Figure 2:
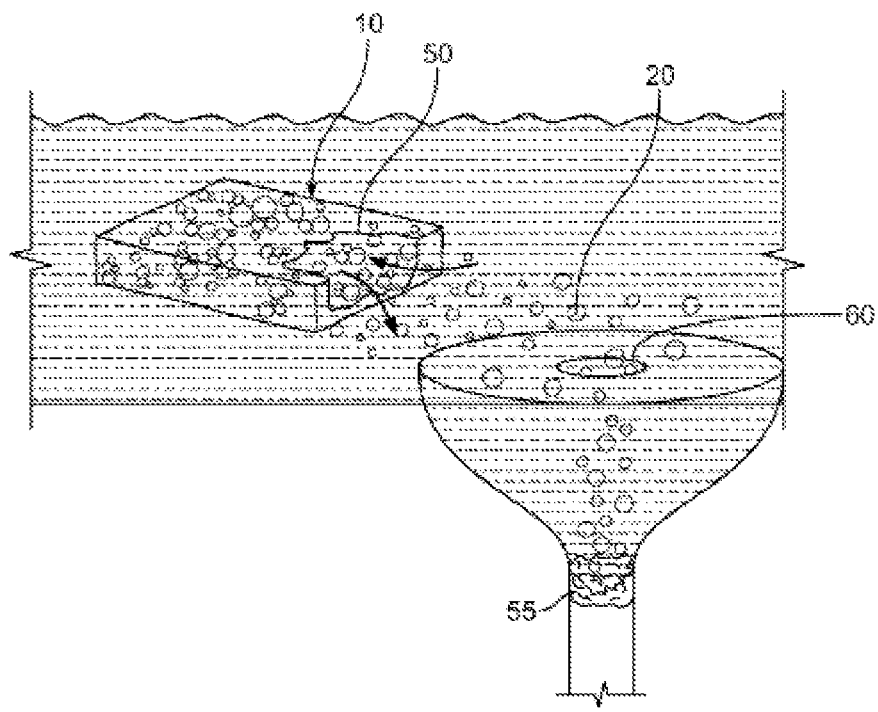
FIG. 2 is a perspective view of an embodiment of a container that has a portion which dissolves.

FIG. 2 is a perspective view of an embodiment of container 10 that has a portion 50 which dissolves. As shown, when portion 50 of container 10 dissolves fluid or ambient matter may enter container 10 and react and or dissolve composition 20 and or force composition 20 out of container 10 so it may effectively pass through a conduit or drain 60 for example and displace an obstruction 55. It is an embodiment of the invention wherein the dissolving portion 50 includes the dissolving of the entire container 10, such that the entire container 50 dissolves. It is yet another embodiment of the invention to have outer wall 15A and the inner wall 15B selectively pervious and or fluctuate in thickness and or dissolvability to control the rate of release of composition 20 from container 10 in either circumstance when walls comprise dissolving portion 50 which may include entire container 10.

As may be understood, some clogged systems may require a larger amount of a predetermined amount of composition 20 or require dispensing of predetermined amount of composition 20 over an extended period of time. In which case, it may be preferred to use a container 10 that has multiple chambers.

Figure 3:
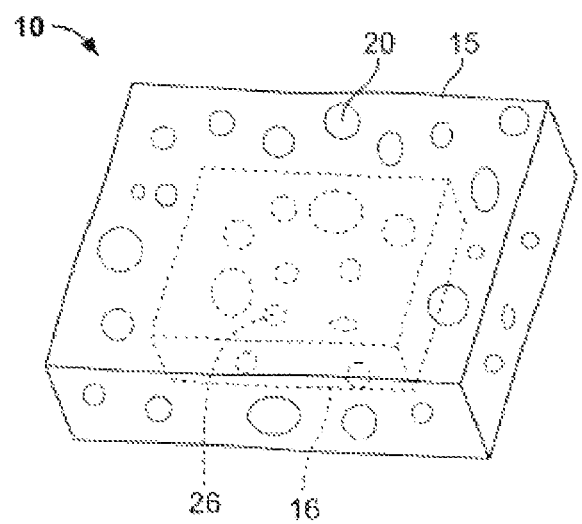
FIG. 3 is a perspective view of an embodiment of a container that has sub chambers that dissolve at different rates and provides a timed release or delay.

FIG. 3 is a perspective view of an embodiment of a container 10 that has two chambers 15 and 16 that may dissolve at different rates and provide a timed release or delay. As shown, a first chamber 15 contains a premeasured amount of composition 20 and surrounds a second chamber 16 containing a predetermined amount of composition 26. As can be understood, upon a portion of chamber wall 15 dissolving, fluid may enter chamber 15 and allow composition 20 to escape chamber 15 wherein same fluid may further begin to dissolve inner chamber 16, wherein which upon dissolving a portion therein shall allow composition 26 to escape chamber 16 and chamber 15, resulting in a timed release of a predetermined amount of composition 20 and 26.

As can be appreciated by the invention, there may be numerous chambers in a container depending on the amount of timed release desired. Furthermore, it is an embodiment of the invention to have walls and or boundaries of chamber(s) fluctuate in thickness and or dissolvability to further control rate of release. It is a further embodiment of the invention for chambers to contain different compositions that may release different composition at same time or different times depending on the circumstance. For example, as in FIG. 3, chamber 15 may contain may contain a pretreatment 20 that is administered to protect a drain or passageways from the subsequent delivered premeasured composition 26 that has an unclogging element. Along the same lines, an additional chamber may be contained within 15 that release a composition that conditions conduits or that treats a septic tank, either before, after or during the time when a composition 26 disperses, and so on.

Notwithstanding, once an obstruction is displaced and a drain is unclogged for example, there may be composition remaining in an unused chamber in the event for example a user accidentally overuses the product. It is therefore a further embodiment of the invention that the remaining contents be stored in a receptacle so as to not introduce into environment as waste or garbage.

Figure 4:
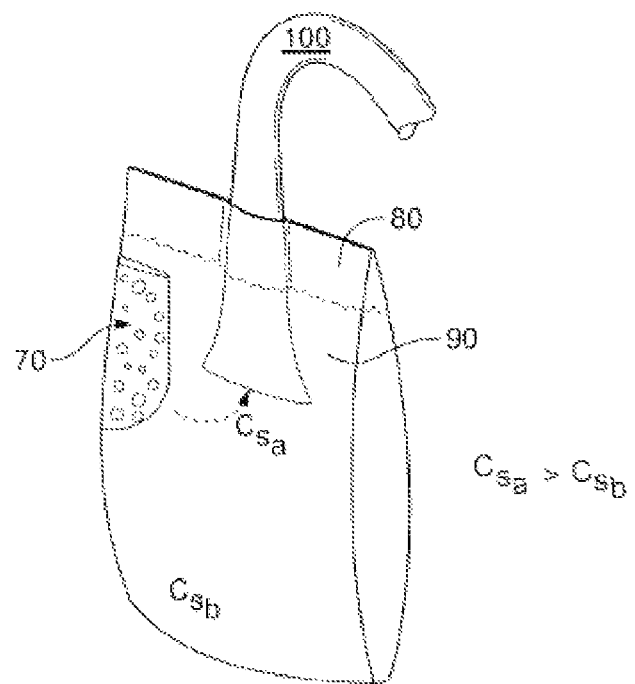
FIG. 4 a perspective view of a receptacle showing an embodiment where a spout may be inserted into the receptacle.

An embodiment of the storage 70 includes it being shaped and sized to resemble a pre-measured quantity amount, such that when the storage 70 is filled, it contains a same amount that is a predetermined single-use dose. Additionally, storage 70 may be pervious to liquid such that when sufficient liquid 90 is introduced to receptacle 80, the composition stored at 70 may dissolve or dilute in storage 70 within receptacle 80 and be poured into a an aggregate pool to release a drain for example. In another embodiment a clogged spout may be submerged into receptacle 80 so that composition 20 may displace obstructions therein. FIG. 4 is a perspective view of an embodiment showing a portion of spout 100 submerged in receptacle 90. As a result of having source of the composition 20 closer to the area of spout 100 where an obstruction may be present, better results may be achieved because the concentration of the composition in fluid 90 near spout 100 $Cs_a$ may be greater than the concentration of the composition at the base of receptacle 90 $Cs_b$, as indicated.

A further embodiment of the invention is introducing a predetermined single use packet into a conduit such that the container and or its contents therein only becomes accessed or used when a system is blocked.

Figure 5A:
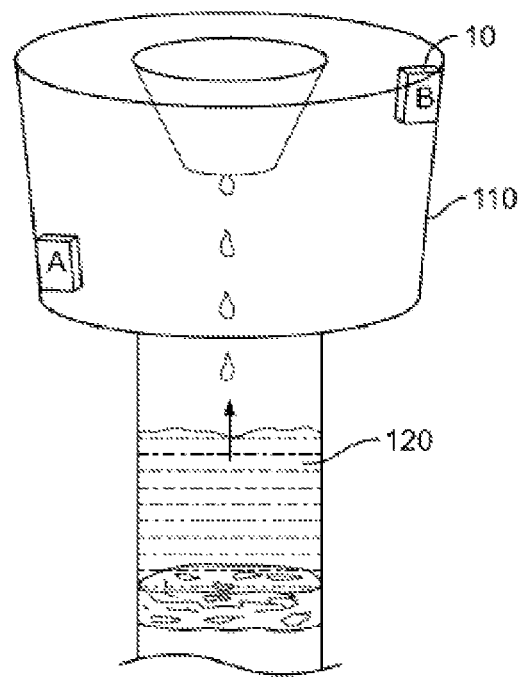
FIG. 5A is a perspective view of an embodiment of a conduit that shows an embodiment where a packet A or B may be used in an overflow.
Figure 5B:
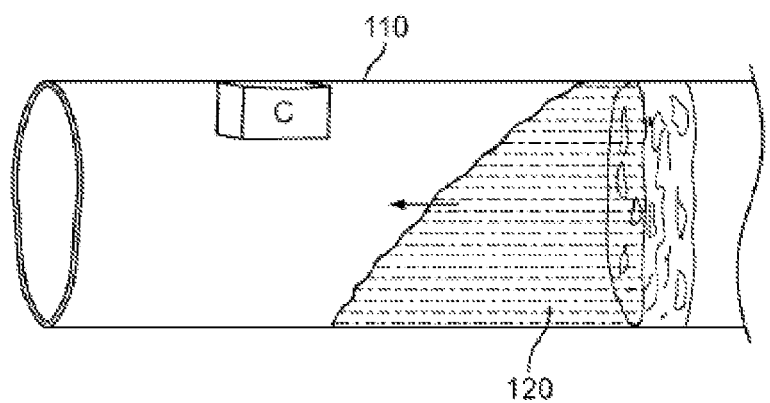
FIG. 5B is a perspective view of an embodiment of a conduit that shows an embodiment where a packet C may be used in an overflow.

FIGS. 5A and 5B show a perspective of embodiments of container A, B, C located in different regions of conduit 110 where a container 10 may advantageously be placed to remain dry until an overflow or clog is experienced. The container 10 may be placed in other locations and may be further combined and or attached within a conduit by an adhesive clip or any other known means of attaching a suitable container to a conduit 110 wall therein. In an embodiment, a packet 10 may be inserted about a dry internal region of a drain, for example, such that when an obstruction causes accumulation of fluid, the container lining comes into contact with the fluid which causes the packet to dissolve and release and or deliver the single use contents. In this embodiment, the single use or predetermined amount of product is delivered automatically, without need of a user.

Figure 6:
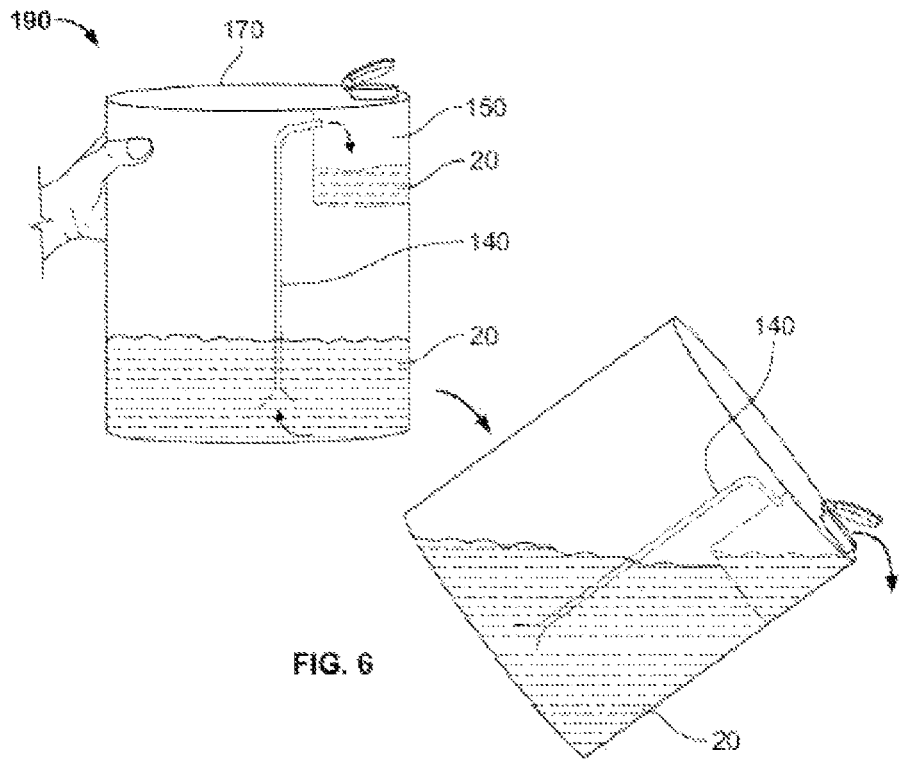
FIG. 6 is a perspective view of an embodiment of a delivery system that has two communicating receptacles whereby a first receptacle delivers a single use or predetermined amount of composition to a second receptacle.

FIG. 6 shows another embodiment of the invention whereby a drain cleaning delivery system 190 comprises a first receptacle 170 that is capable of storing a composition 20, whereby when the first receptacle 170 stores composition 20, a measured portion of composition 20 is capable of being displaced such that the first receptacle 170 transfers said portion of composition to a second receptacle 150. The embodiment of the invention discloses another delivery of a premeasured amount of a composition.

As shown in FIG. 6, composition 20 may be displaced for example by squeezing first receptacle 170 as shown by the hand. Effectively, this would force composition 20 through tube 14 which would empty into second receptacle 150 as shown. It is an embodiment that the second receptacle 150 can be self-regulating such that the amount of composition that enters and or is maintained in second receptacle 150 is predetermined amount that is minimally sufficient to use as a single application to clear a drain.

Figure 7:
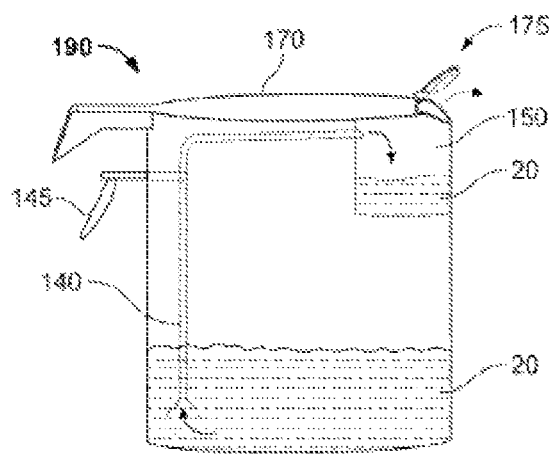
FIG. 7 is a perspective view of another embodiment of how a first receptacle and second receptacle according to the instant invention.

Once a sufficient amount of composition 20 enters into second receptacle 150, the premeasured amount may thereafter be delivered to an area, such as a clogged sink, for example. Additionally, the second receptacle may have a stop 175 as shown in FIG. 7, which also shows another embodiment of a drain cleaning delivery system. Stop 175 may include a pull, twist, pop, one-way valve and other known exit orifice means. It is understood that a predetermined about of composition may be delivered from first receptacle 170 to second receptacle 150 by other displacing and or delivery means, such as inverting the receptacles or utilizing an automated procedure that ensures second receptacle remains full, and so on. In the embodiment shown in FIG. 7 however, composition 20 may be displaced by use of a trigger 145 that assists with transfer of composition 20 from first receptacle 170 to second receptacle 150. Notwithstanding, it is within the scope of the invention that receptacle 170 can deliver a single premeasured amount of composition 20 without a second receptacle intermediary step.

Figure 8:
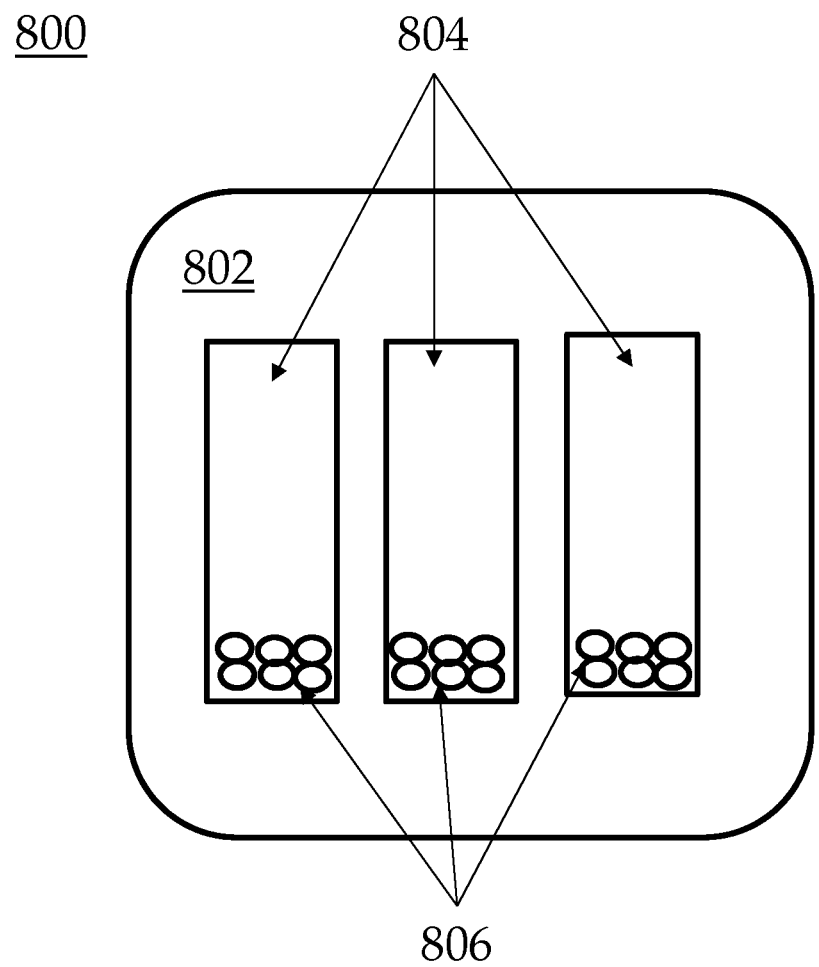
FIG. 8 is a block diagram depicting a kit for unclogging a drain in accordance with an exemplary embodiment of the present invention.

FIG. 8 is a block diagram depicting a kit 800 for unclogging a drain in accordance with an exemplary embodiment of the present invention. The kit 800 may comprise a container 802 housing a plurality of single-use packets 804. The container 802 may comprise a box, a package, a receptacle, and/or the like, constructed to house the plurality of single-use packets 804. The plurality of single-use packets 804 may comprise a wall, that may comprise plastic, enclosing an interior space for housing a granular drain-clearing composition 806. The granular drain clearing composition 806 may comprise a composition in accordance with exemplary embodiments of the present disclosure. For example, the granular drain-clearing composition 806 may comprise sodium bisulfate, or the like.

Various changes and modifications may be made without departing from the spirit and scope of the Invention and it is intended that such obvious changes and modifications be embraced by the annexed claims. It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

While the foregoing is directed to embodiments of the present invention, other and further embodiments of the invention may be devised without departing from the basic scope thereof. For example, although numerous embodiments having various features have been described herein, combinations of such various features in other combinations not discussed herein are contemplated within the scope of embodiments of the present invention.

What is claimed is:

1. A composition for clearing a clogged drain, the composition comprising:
   between 90% and 95% sodium bisulfate by weight; and
   between 0.05% and 0.19% moisture by weight;
   between 3% and 9% sodium sulfate by weight;
   between 0.5% and 0.9% potassium by weight;
   between 0.5% and 0.9% calcium by weight; and
   between 0.5% and 0.9% iron by weight.

2. The composition of claim 1, wherein the composition is in a granular form.

3. A method for clearing a clogged drain, the method comprising:
   providing a drain-clearing composition, the composition comprising:
   between 90% and 95% sodium bisulfate by weight;
   between 0.05% and 0.19% moisture by weight;
   between 3% and 9% sodium sulfate by weight;
   between 0.5% and 0.9% potassium by weight;
   between 0.5% and 0.9% calcium by weight;
   between 0.5% and 0.9% iron by weight; and
   dispensing the composition into the clogged drain and allowing the composition to clear the clogged drain.

4. The method of claim 3, wherein the wall is formed of a material that is unreactive to the drain-clearing composition and inert to ambient conditions.

5. A kit for use in clearing a clogged drain, the kit comprising:
   a plurality of single-use packets, each packet comprising a wall forming a chamber, a portion of the wall constructed to be torn open;
   a pre-measured amount of a drain-clearing composition disposed in the chamber of each packet, the pre-measured amount comprising the minimal amount of drain-clearing composition necessary to clear the clogged drain;
   wherein the drain-clearing composition comprises:
   between 90% and 95% sodium bisulfate by weight;
   between 0.05% and 0.19% moisture by weight;
   between 3% and 9% sodium sulfate by weight;

between 0.5% and 0.9% potassium by weight;
between 0.5% and 0.9% calcium by weight; and
between 0.5% and 0.9% iron by weight.

6. The kit of claim 5, wherein the wall is formed of a material that is unreactive to the pre-measured amount of the drain-clearing composition and inert to ambient conditions.

7. The kit of claim 5, wherein the composition is in a granular form.

8. The kit of claim 5, wherein the plurality of single use packets is housed within an outer package.

* * * * *